Feb. 20, 1962 R. A. SHAW 3,022,026
AIR INTAKE FOR JET SUSTAINED AIRCRAFT
Filed April 17, 1959 2 Sheets-Sheet 1

Inventor
RONALD ANDREW SHAW
By
Larson and Taylor Attorney

| United States Patent Office | 3,022,026
Patented Feb. 20, 1962 |
|---|---|

3,022,026
AIR INTAKE FOR JET SUSTAINED AIRCRAFT
Ronald Andrew Shaw, Hemel Hempstead, England, assignor to Power Jets (Research and Development) Limited, London, England, a British company
Filed Apr. 17, 1959, Ser. No. 807,041
Claims priority, application Great Britain Apr. 23, 1958
3 Claims. (Cl. 244—23)

This invention relates to sideways-facing air intakes in aircraft outer surfaces, over which surfaces, when the aircraft is in forward flight, there is an air flow in a direction transverse to the axis of the intake.

In particular, the invention is concerned with air intakes for aircraft lifting engines and fans. Proposals have been made for mounting jet engines in the fuselage of an aircraft so that they draw in air through intakes in the fuselage upper surface and discharge their jet streams downwardly to impart vertical thrust to the aircraft for hovering and for take-off and landing. It has also been proposed to mount lifting fans in a generally horizontal plane in the aircraft wings, the fans drawing in air through intakes in the wing upper surface and discharging it downwardly as a stream to afford vertical thrust. In each case the intakes will have their axes substantially normal to the direction of flight and to the surface of the fuselage or wing so that when the aircraft is in flight there is a flow over the surface and transversely across the intake opening, and these cross flow conditions will tend to cause poor velocity distribution across the intake and possibly severe turbulence which will give rise to disturbances in the operation of the engine or fan. Moreover in flight the static pressure at the intake will often be less than that at the engine or fan outlet on the fuselage or wing under-surface, and so it may be difficult to induce a flow into the intake on starting, and the engine or fan may even windmill in the wrong direction.

Accordingly the invention provides an air intake in an aircraft surface, over which surface, when the aircraft is in forward flight, there is an airflow in a direction transverse to the axis of the intake, wherein at least the forward edge of the intake in relation to the direction of the airflow is rounded to merge into the outer surface of the aircraft and the intake has at least one nozzle arranged to discharge a fluid stream generally tangentially to the rounded edge so that the stream flows as a thin layer over the edge into the intake.

There may be a single elongated nozzle extending along the edge of the intake or a plurality of nozzles distributed along the edge.

The invention will now be more fully described by way of example with reference to the accompanying drawings, of which:

Figure 1:
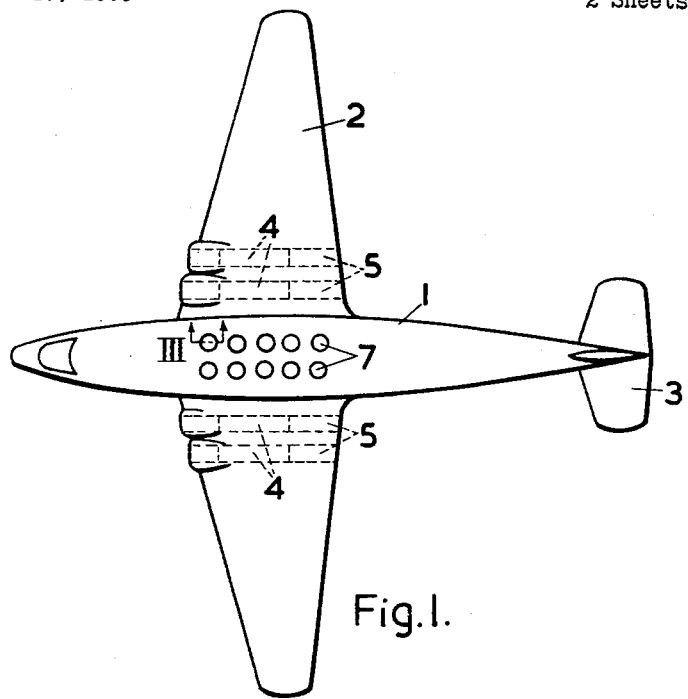
FIGURES 1 and 2 are respectively a plan view and a side elevation of an aircraft of the jet-lift type, that is, one having lifting engines arranged to impart vertical thrust to the aircraft.
Figure 2:
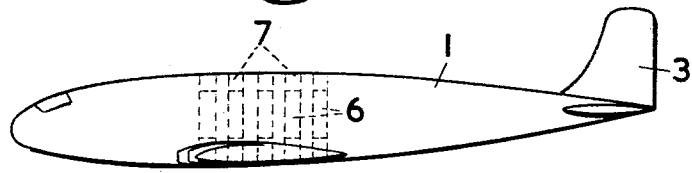

The aircraft of FIGURES 1 and 2 comprises a fuselage 1, a pair of opposite wings 2 and a tail unit 3, and is powered by four gas turbine jet propulsion engines 4 mounted in pairs close to the wing roots in conventional manner, the engines being connected to discharge rearwardly directed propulsive jet streams through jet pipes 5 to produce forward thrust on the aircraft. In addition the aircraft has mounted within its fuselage a number of, in this case, ten jet lifting gas turbine engines 6, the engines being arranged with their axes vertical, and their jet nozzles directed downwardly. As shown in more detail in FIGURE 3, each engine 6 is connected to draw in air through an air intake 7 of circular shape in the fuselage upper surface 1a, while its jet nozzle 8 is arranged to discharge a jet stream vertically downwardly through an outlet aperture 9 in the fuselage lower surface 1b. The lifting engines 6 are grouped so that their resultant line of action passes through or close to the aircraft centre of gravity and are such that their total thrust is equal to or greater than the weight of the aircraft. The lifting engines are thus able to sustain the aircraft by jet lift alone without the assistance of the aerodynamic lift afforded by the wings, and it is possible for the aircraft to hover and to take-off and land substantially vertically.

During normal forward flight, the lifting engines 6 are inoperative, aerodynamic lift being afforded by the wings in the usual way. For landing, it is necessary to start the lifting engines 6, and due to the cross-flow conditions at their intakes 7, the difficulties in inducing an air flow into the intakes as discussed above are liable to arise.

Accordingly, the forward edge of each intake (in relation to the direction of the relative main stream air flow as indicated by the arrow A) is rounded to merge into the upper surface 1a of the aircraft, and this edge is formed approximately where it meets the upper surface with a shallow elongated air discharge nozzle 10 facing inwardly with respect to the intake and arranged to discharge substantially tangentially to the rounded edge. This nozzle is supplied from a manifold 11 to which leads a supply pipe 12 incorporating a control valve 13 and a stop valve 14. In the present example the nozzle and manifold extend around almost half the circumference of the intake. The rearward edge of the intake is similarly rounded and is formed with a similar nozzle 10a extending around the other half of the intake circumference, and this nozzle is likewise associated with a manifold 11a, supply pipe 12a and valves 13a, 14a. The pipes 12, 12a are connected by a common supply pipe 15 to a source of compressed air, e.g., air bled off from the compressors of the main jet engines 4. It will be noted that the manifolds are shaped to promote uniform distribution of the air supply along the nozzles.

When it is desired to start the lifting engines when the aircraft is in forward flight, the valve 14 is opened and compressed air supplied to nozzle 10. Due to Coanda effect, the air flows as a thin continuous layer over the rounded forward edge of the intake 7 into the latter (as indicated by arrows B), and in so doing induces part of the main stream air flow over the surface of the fuselage to enter the intake with full total head pressure. The tendency to flow separation at the edge of the intake and to windmilling of the engine in the wrong direction is thereby counteracted.

Figure 3:
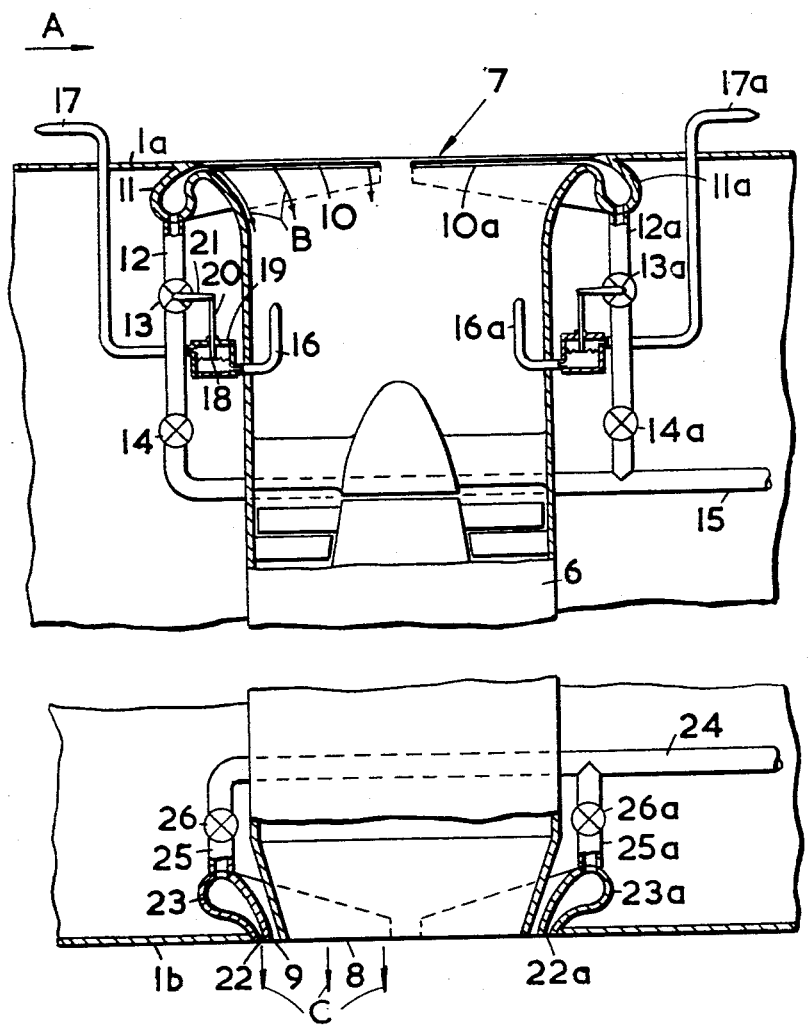
FIGURE 3 is a sectional view taken on the line III—III in FIGURE 1 showing certain details of one of the lifting engines.

The width of the nozzle 10 has been greatly exaggerated in FIGURE 3 for the sake of clarity. A width of the order of 0.02 inch would be sufficient if compressed air bled from the engines 4 is used, though a greater width would be necessary if a source of compressed air supply at a lower pressure were used.

In order to control the compressed air supply to the nozzle 10, a sensing pitot head 16 is provided within the intake, close to but spaced from the side of the intake, i.e., the forward side, liable to separation. A further pitot head 17 is provided ahead of the intake to measure the main stream total head. This pitot head may be the pitot head of the aircraft air speed indicator system. The two pitot heads 16, 17 are connected to opposite sides of a flexible diaphragm 18 in casing 19, and the diaphragm is connected through connecting rod 20 to the operating lever 21 of the control valve 13, the arrangement being such that as the total head sensed by pitot head 16 becomes equal to that sensed by pitot head 17, movement of the diaphragm 18 tends to close valve 13, and the supply of compressed air to the nozzle 10 is thereby limited to that required to maintain the total heads substantially equal.

The direct connection between rod 20 and lever 21 can of course be replaced by a servo-mechanism of known type.

It may also be desired to use the lifting engines for hovering flight while the aircraft is moving backwards, and in these circumstances there may be a tendency to flow separation at the rearward edge of the intake. Accordingly the valve 14a may then be opened and air discharged through nozzle 10a to promote flow of the main stream around the rearward edge of the intake. The flow is regulated by control 13a which is operable in response to the total head pressures measured by pitot heads 16a, 17a in the manner previously described.

The tendency for the lifting engines to windmill in the wrong direction can also be counteracted by baffling the main stream at the engine outlets. Accordingly there are provided two narrow semi-circular air discharge nozzles 22, 22a extending around the forward and rearward edges of the outlet 9 of each lifting engine. These nozzles are directed vertically downwardly and are connected to manifolds 23, 23a. Compressed air is supplied to the manifolds, through pipe 24 and branch pipes 25, 25a which incorporate separate stop valves 26, 26a, from the same source of supply as that supplying the nozzles 10, 10a, e.g., the compressors of the engines 4. When starting up the engine in forward flight of the aircraft, valve 26 is opened so that compressed air is discharged through nozzle 22 as a thin sheet extending around the forward edge of the outlet (as indicated by arrows C), thereby baffling and deflecting the main stream flow under the fuselage. If the aircraft moves backwards when in hovering flight, compressed air may similarly be discharged through nozzle 22a.

The valves 14, 26 and the valves 14a, 26 may be interconnected so that compressed air may be supplied simultaneously to nozzles 10, 22 or nozzles 10a, 22a as the case may be.

Figure 4:
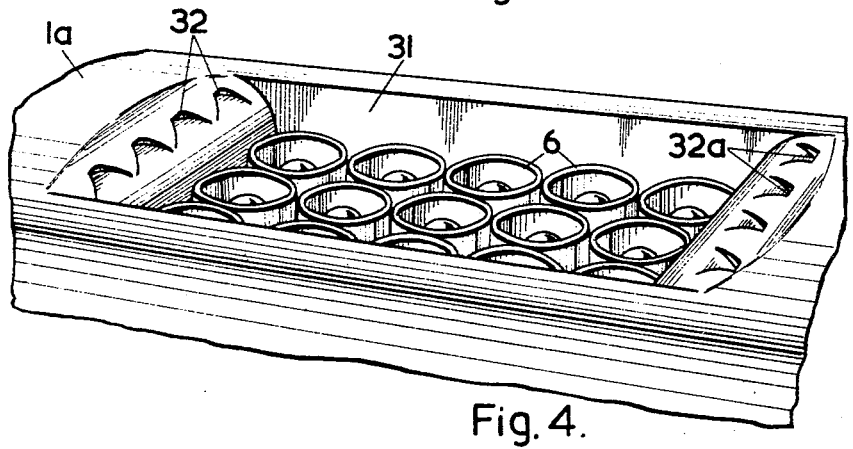
FIGURE 4 is perspective view of the intake to the lifting engines of an alternative embodiment.

In the modification shown in FIGURE 4, the lifting engines 6 are connected to draw in air through a single rectangular intake 31 in the fuselage upper surface 1a. The forward and rearward edges of the intake are rounded to merge into the fuselage upper surface and each edge is formed with a number of individual air discharge nozzles 32, 32a recessed into the rounded surfaces. These nozzles are connected to a source of compressed air in the same way as the nozzles 10, 10a of the previously described embodiment so that air may be discharged over either or both of the rounded edges into the intake, the individual streams from the separate nozzles combining to form a substantially continuous layer.

In some embodiments it may not be necessary to allow for rearward movement of the aircraft, and so the air nozzles 10a, 22a, 32a and the associated air supply equipment may be omitted. Also, in the case of a circular intake and outlet as shown in FIGURE 3 it may be sufficient for the nozzles 10 and 22 to extend around less than half, say, a quarter of, the intake and outlet circumferences respectively.

It will be understood that the continuous nozzles 10, 10a shown in FIGURE 3 could be replaced by individual nozzles of the type shown in FIGURE 4, and vice versa.

The invention is also applicable to aircraft of the type provided with lifting fans for sustaining the aircraft. An example of such an aircraft is disclosed in British patent specification No. 811,840 the aircraft having a pair of relatively large diameter fans mounted within the wings and connected to draw in air through intakes in the wing upper surface and to discharge the air downwardly as a stream through outlets in the wing lower surface. The fan rotors have mounted on their peripheries turbine rotor blades which are driven by exhaust gases diverted from the jet pipe of the engine used for forward propulsion of the aircraft. The embodiment disclosed in this patent specification may according to the present invention be modified by providing the intakes with rounded edges over which air may be discharged as thin layers in the manner already described. Similarly thin sheets of air may be discharged at the edges of the fan outlets to baffle the main stream flow on the wing lower surfaces.

I claim:

1. An aircraft having an outer surface formed with an air intake, over which surface, when the aircraft is in forward flight, there is an air flow in a direction transverse to the axis of the intake, said intake having a rounded edge portion at least on its forward side in relation to the direction of said air flow and said edge portion merging into said outer surface and being formed with nozzle means arranged to discharge a fluid stream generally tangentially to said rounded edge portion so that the stream will flow as a thin layer over said edge portion into said intake, means for sensing the total head of the air flow over said surface, means for sensing the total head of the flow within the intake, and means to supply fluid to said nozzle means, said fluid supply means including a valve operable jointly by said two sensing means to limit the supply of fluid to said nozzle means to that required to maintain said total heads substantially equal.

2. An aircraft having an upper outer surface formed with an air intake and a lower outer surface formed with an outlet aperture, over which surfaces, when the aircraft is in forward flight, there is an air flow in a direction transverse to the axes of the intake and the outlet aperture respectively, lifting means connected to draw in air through said intake and to discharge a stream downwardly through said outlet aperture, said intake having a rounded edge portion at least on its forward side in relation to the direction of the air flow over said upper surface and said edge portion merging into said upper surface and being formed with nozzle means arranged to discharge a fluid stream generally tangentially to said rounded edge portion so that the stream will flow as a thin layer over said edge portion into said intake, means for sensing the total head of the air flow over said upper surface, means for sensing the total head of the flow within the intake, and means to supply fluid to said nozzle means, said fluid supply means including a valve operable jointly by said two sensing means to limit the supply of fluid to said nozzle means to that required to maintain said total heads substantially equal.

3. An aircraft according to claim 2 wherein said lifting means comprises at least one jet engine.

References Cited in the file of this patent

UNITED STATES PATENTS

| | | |
|---|---|---|
| 2,843,338 | Streib | July 15, 1958 |
| 2,843,339 | Streib | July 15, 1958 |
| 2,864,236 | Toure | Dec. 16, 1958 |
| 2,875,578 | Kadosch | Mar. 3, 1959 |
| 2,922,277 | Bertin | Jan. 26, 1960 |
| 2,936,969 | Griffith et al. | May 17, 1960 |